F. SEABERG.
CAR.
APPLICATION FILED JULY 2, 1909.
1,093,886.
Patented Apr. 21, 1914.
7 SHEETS—SHEET 6.
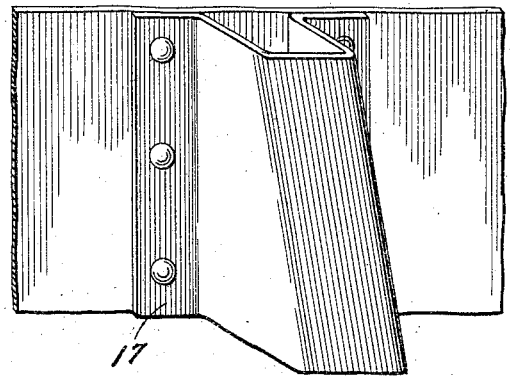
Fig. 10.
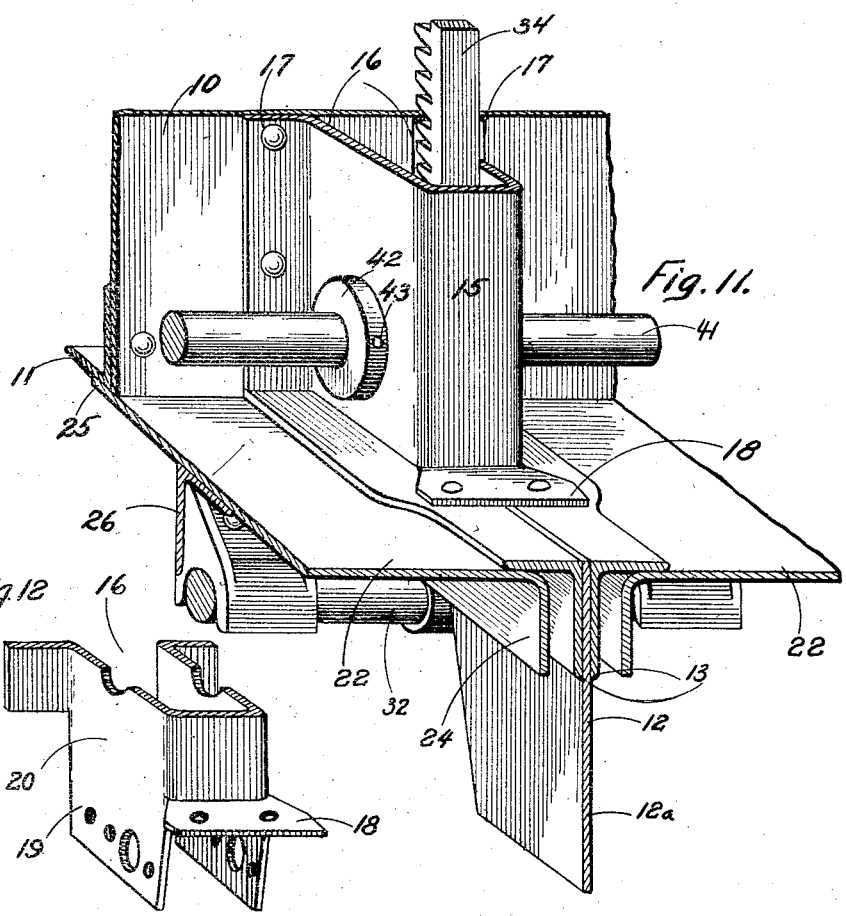
Fig. 11.
Fig. 12.
Witnesses:
C. E. Burnap
A. L. Walton
Inventor:
Frederick Seaberg
By Sheridan, Wilkinson & Scott Att'ys

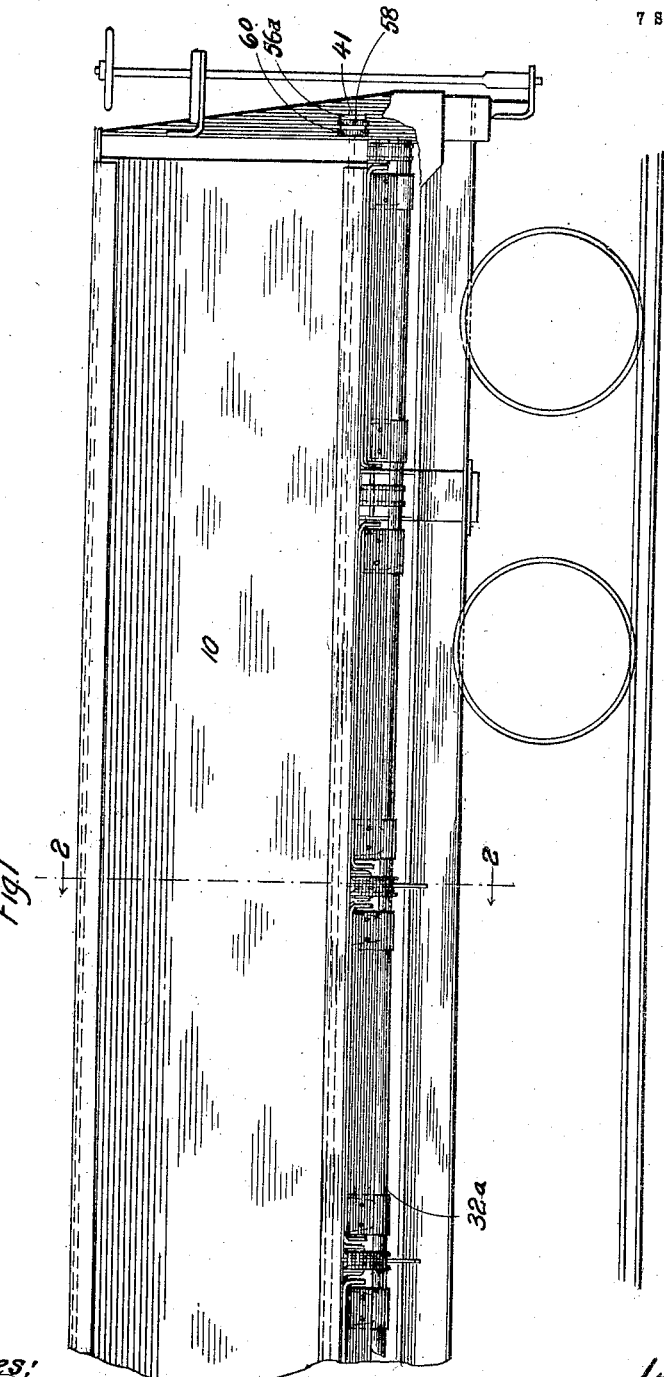

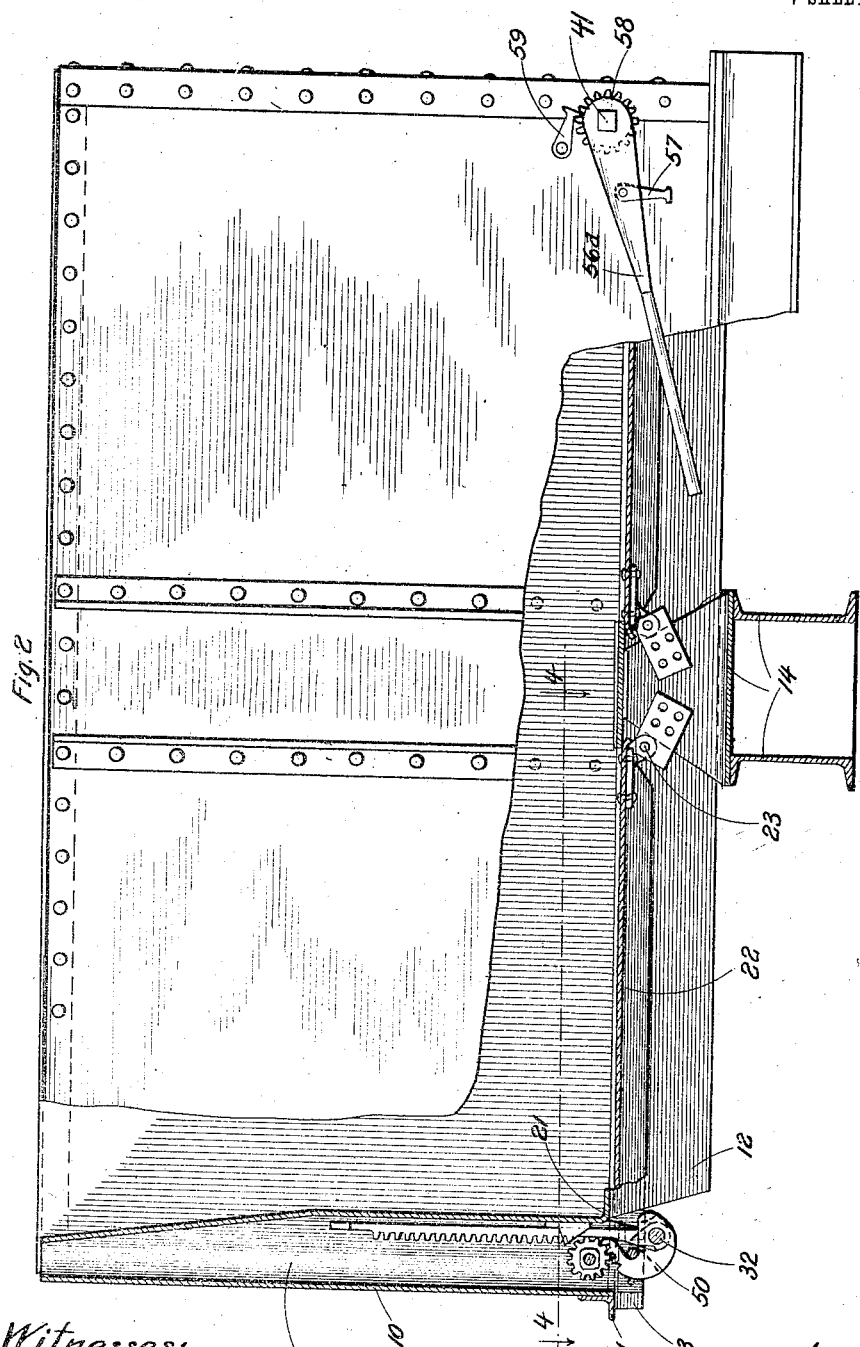

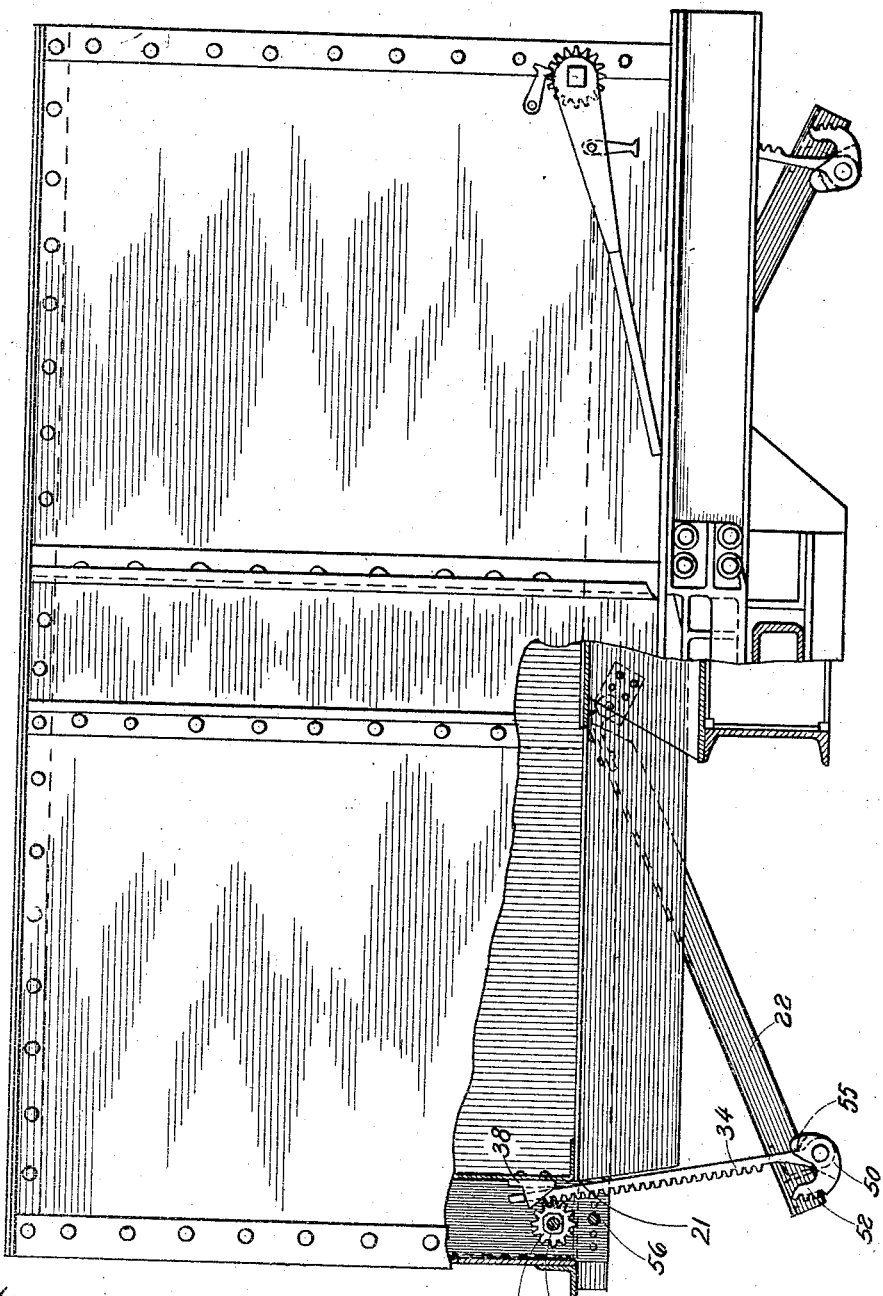

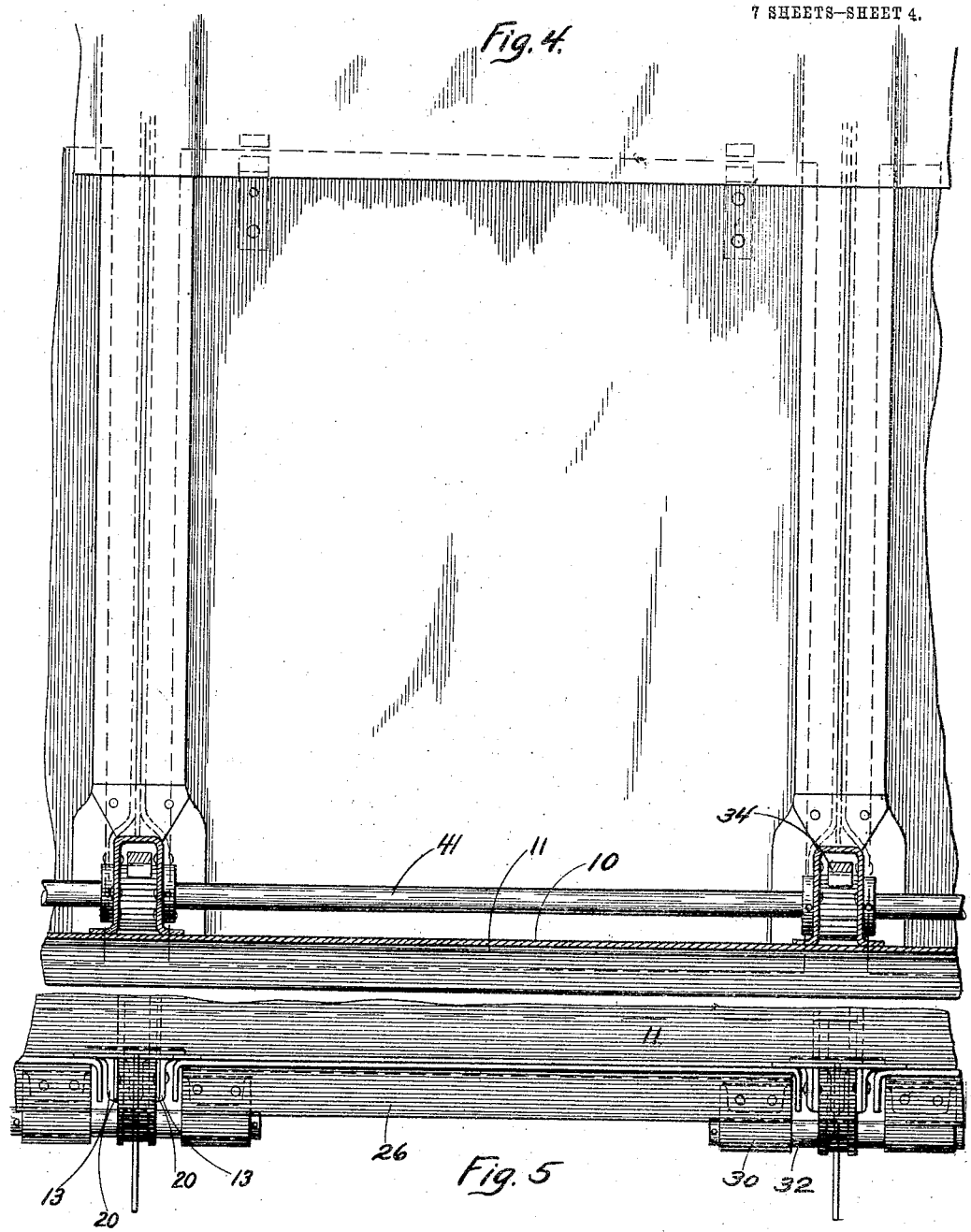

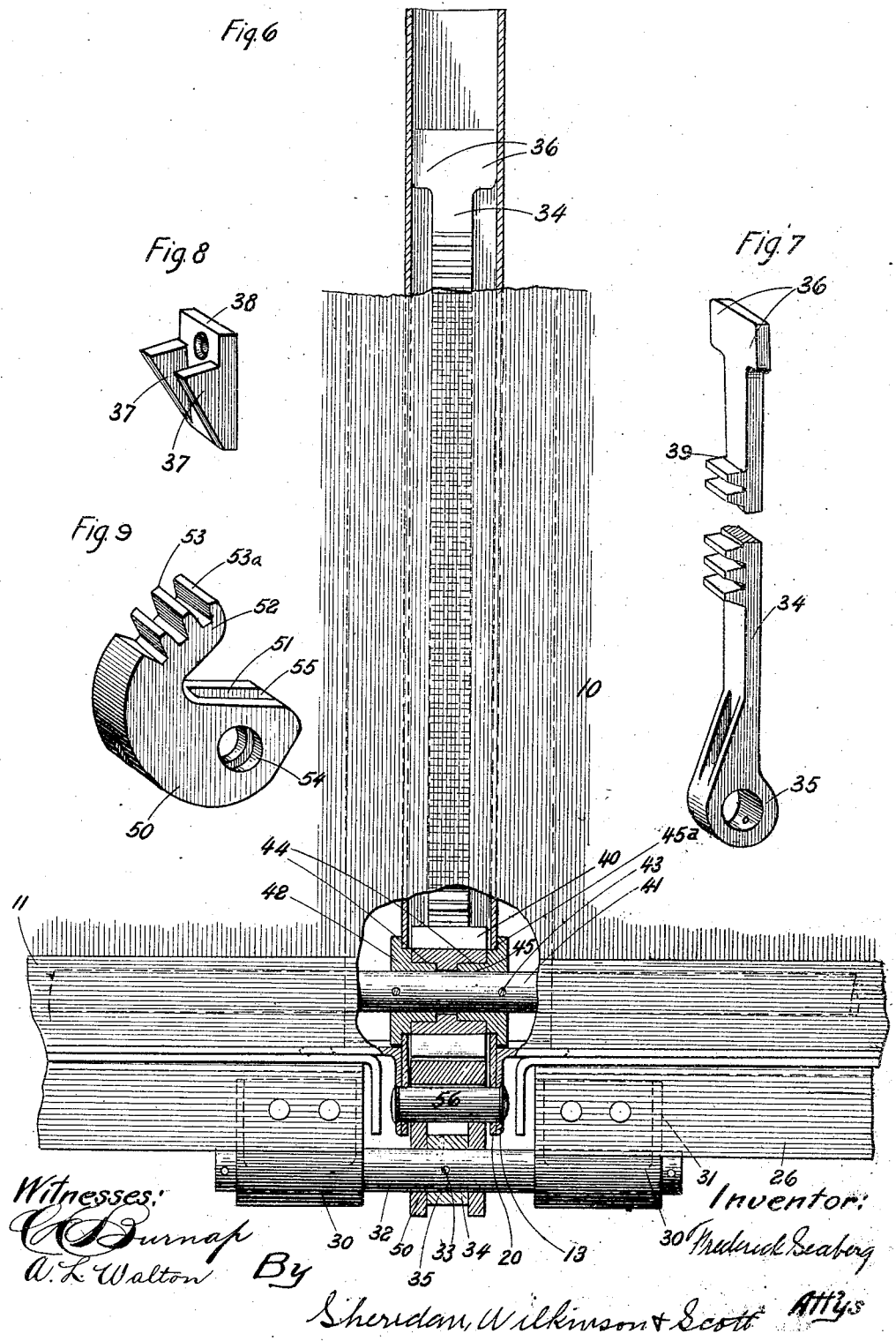
F. SEABERG.
CAR.
APPLICATION FILED JULY 2, 1909.
1,093,886. Patented Apr. 21, 1914.
7 SHEETS—SHEET 5.

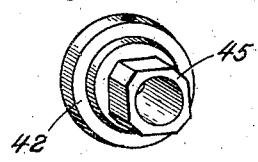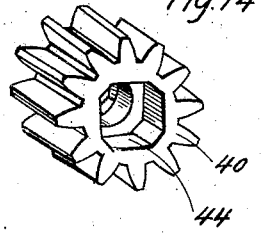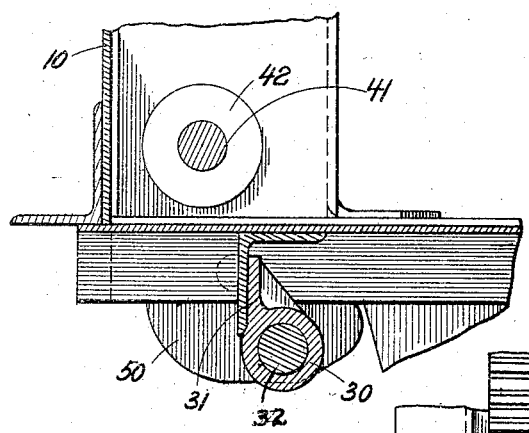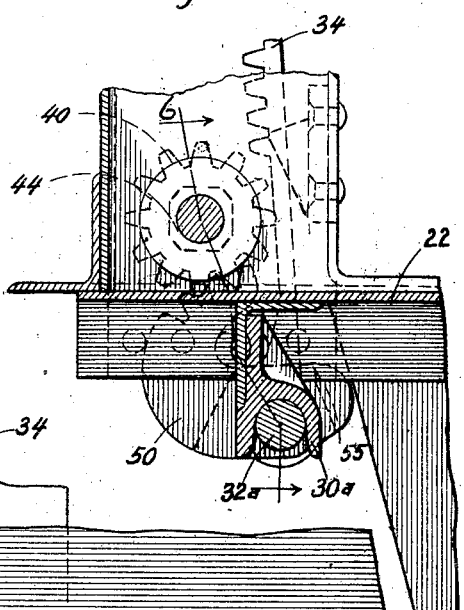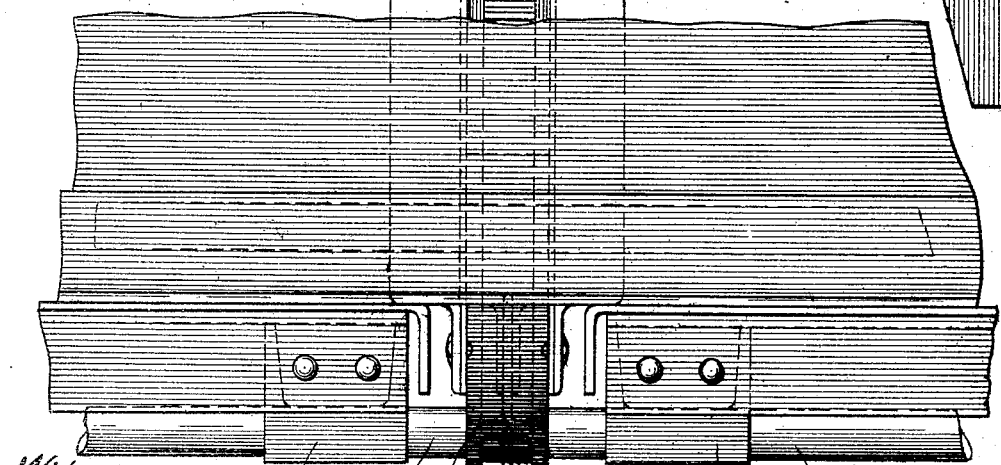

UNITED STATES PATENT OFFICE.

FREDERICK SEABERG, OF CHICAGO, ILLINOIS, ASSIGNOR TO NATIONAL DUMP CAR COMPANY, A CORPORATION OF MAINE.

CAR.

1,093,886.   Specification of Letters Patent.   Patented Apr. 21, 1914.

Application filed July 2, 1909.   Serial No. 505,554.

*To all whom it may concern:*

Be it known that I, FREDERICK SEABERG, a citizen of the United States, residing at Chicago, in the county of Cook and State of Illinois, have invented certain new and useful Improvements in Cars, of which the following is a specification.

The object of my invention is to provide an improved operating mechanism for the doors of dump cars. It is especially designed for use in that class of dump cars in which there is a horizontal floor and in which the greater part of said floor consists of doors hinged at or near the longitudinal center line of the car. The doors are hinged in such manner as to allow the outer edges beneath the side walls of the car to drop and discharge the contents outside the track. My improvements are applicable, however, to other forms of dump cars.

My improvements comprise toothed bars or racks pivotally attached to the outer corners of the doors and operated by a pinion on an operating shaft lying adjacent to the outer edges of the dump doors. This operating shaft is worked by a hand lever and ratchet mechanism at the end of the car.

Another feature of my improvements is a toothed member carried by the doors for holding them in a closed position which is operated by the same pinion that actuates the toothed bar or rack. This toothed member is preferably pivoted to the doors and may be moved into engagement with a pin or other suitable part of the car frame. When thus engaged, it relieves the toothed bar or rack and other parts of the mechanism of strain.

Other and further objects of my invention will be made apparent in the following description and claims, taken in connection with the accompanying drawings, in which—

Figure 1 is a side elevation of a dump car with my improvements attached. Fig. 2 is an end elevation with a portion broken away and showing a sectional view through a side stake on line 2—2, Fig. 1. Fig. 3 is an end elevation similar to Fig. 2, with the doors in a lowered position. Fig. 4 is a plan view, partly in section on line 4—4 of Fig. 2. Fig. 5 is a side elevation of the lower portion of the car body showing particularly the doors in a closed position. Fig. 6 is a side elevation, on a larger scale, partly in section, of a portion of the car body adjacent a side stake. Fig. 7 is a perspective view of one of the racks. Fig. 8 is a perspective view of one of the rack guides and stop lugs. Fig. 9 is a perspective view of the pivoted hook or door holding member. Fig. 10 is a perspective view of the upper portion of the hollow side stake. Fig. 11 is a perspective view of the lower portion of the hollow side stake, framework and related parts. Fig. 12 is a perspective view of the lower end of the side stake when removed from the car. Fig. 13 is a perspective view of one of the collars for driving the gears. Fig. 14 is a perspective view of one of the gears. Fig. 15 is a section through the outer edge of the door and its connections to the operating mechanism. Fig. 16 is a section through the outer edge of the door, showing a modification in its connections to the operating mechanism. Fig. 17 is a side elevation of the same.

In the drawings, the side walls 10 of the car body are fixed to the side sill 11, preferably made of an angle bar. The side sill 11 and side wall 10 are supported by the transverse sills 12, which comprise the vertical webs or plates 12ª and angle bars 13. The transverse sills are supported at the center of the car by a longitudinal center sill 14 to which they are rigidly attached. Connection is made between the side walls 10 and the transverse sills 12 by the side stakes 15 which rise from the outer extremities of the transverse sills. The side stakes are of hollow rectangular form in cross section, and are, preferably, made of sheet or plate metal formed into shape. They are formed with one side open, as seen at 16, and are provided with flanges 17 by which they are riveted to the wall plates 10 of the car body. The wall plates 10 serve as one side of the rectangular hollow body of the side stake. At or near the lower end of the side stake a lug or flange 18 is made by bending outwardly a portion of the inner wall of the side stake, as shown in Fig. 12. This lug or flange 18 is horizontally disposed and is placed upon and riveted to the angle bars 13 of the transverse sills 12. The downwardly extending side walls 20 of the side stakes 15 are riveted at their lower extremities 19 to the same angle bars 13. The angle bars 13 are placed with their vertical legs in contact with and fixed to the web or plates 12 in the greater part of their length, but are spread apart near their outer ends sufficiently to inclose the side stake 15. The plate 12 forming the main body of the transverse sill is made to end at the base of the inner wall of the side stake as shown at 21, and is beveled at its end. The purpose of this construction is to give room for the mechanism to be described for operating the dump doors. This mechanism requires free access to the lower end of the side stake 15.

The dump doors 22 are pivoted at 23 to the center sill 14. The lateral edges 24 are bent downwardly at right angles to the body of the door to form stiffening and strengthening flanges. The lateral edges of the doors lie beneath the horizontally disposed leg of the angle bars 13. The outer edge 25 lies beneath the lower edge of the side wall 10 and the side sill 11. A stiffening and strengthening angle bar 26 is fixed to the under side of the door near its outer edge. There is a series of dump doors 22 on each side of the center sill 14, alternately arranged with transverse sills 12 in the dump cars for which my improvements are chiefly designed. The door 22 is held in a closed position by mechanism attached at the outer corners by means of the sleeves 30 having flanges 31 by which they are riveted to the angle bars 26. The sleeves 30 on adjacent doors are connected by the bar 32 loose in said sleeves. This bar 32 may be of sufficient length to extend through the sleeves 30 on adjacent doors only, as shown in Figs. 5 and 6, or it may be a long bar extending through all the sleeves of the doors on one side of the car in half the length of said car. These long bars are shown at 32ª in Figs. 1 and 17.

Fixed to the bars 32 or 32ª by pins 33 are the rack bars 34 which have an eye 35 at their lower ends by which they are attached to the bars 32 or 32ª. At their upper ends they have laterally projecting lugs 36 which bear upon the inner faces of the walls of the hollow side stake 15, and are thereby guided centrally in said stakes. They are further guided by the wings 37 of the pieces 38 which are fixed to the inner walls of the side stakes. The teeth 39 of the rack bars 34 are designed to mesh with the pinions 40 on the operating shaft 41. It will be seen that a rotation of the pinions 40 in one direction will cause the rack bars 34 to rise and pull the doors 22 upwardly to a closed position. When the pinions are rotated in the opposite direction, or left free to rotate, the rack bars 34 will be drawn downwardly by the weight of the doors. This downward movement will be limited by engagement of the laterally projecting lugs 36 with the wings 37 of the pieces 38. The pinions 40 are mounted upon the shaft 41 by means of interposed collars or sleeves 42 which are fixed to the shaft by means of the pins 43. The pinions 40 are provided with polygonal sockets 44 which receive polygonal extensions 45 of the sleeves 42. These polygonal sockets and extensions are preferably octagonal, as shown most clearly in Figs. 13 and 14. The operating shaft will, of course, drive the pinions by means of the sleeves 42 and the said polygonal connections. The sleeves 42 are fitted into apertures 45ª in the walls of the side stakes 15 which serve as bearings for them.

The doors 22 are held in a closed position by pivoted members 50 which have the general form of a hook. These members 50 are loosely mounted upon the bars 32 or 32ª, and are recessed in their body portions at 51 to receive the eye 35 of the rack bar 34. As the eye 35 of the rack bar is fixed to the bars 32 or 32ª by a pin 33, the members 50 are held against sliding along said bars and are kept in a central position with reference to the stakes 15. The pivoted members or hooks 50 are provided with a hook shaped arm 52 having teeth 53 forming a segment of a gear whose axis coincides with that of the hole 54 on which it is pivoted. The teeth 53 are adapted to mesh with the teeth of the pinion 40. The recess 51 is of such form that the member or hook 50 will have a limited movement about its pivot. The movement is limited in an outward direction by the cross piece or rib 55 which comes in contact with the back of the rack bar 34. The movement is limited to such an extent that the first tooth 53ª will not leave the pinion 40 while the door 22 is closed. The hook shaped arm 52 is designed to pass over the pin 56 fixed in the transverse sill at the base of the side stake. It is moved upwardly and inwardly by the pinion 40 until the pin 56 limits the movement. In this position the doors 22 are held closed very effectually and can be opened only when the pinion 40 is rotated in the opposite direction sufficiently to release the hook shaped arm 52 from the pin 56. The teeth 39 on the rack bar 34 are so placed that the lowermost tooth of said rack leaves the pinion 40 at the moment the arm 52 begins to bear upon the pin 56 when it is being rotated inwardly by the pinion 40. The rotation of the pinion 40 cannot then cause a further upward pressure on the rack bar, and thus cause damage. The uppermost tooth 53ª is designed to come into full mesh with the teeth of the pinion 40 at the instant the door 22 is closed. Further movement of the pinion at that instant will cause the hook 52 to be rotated inwardly, but will not produce a further upward movement of the rack bar 34. A rotation of the pinion in an opposite direction will cause the hook 52 to be drawn away from the pin 56 and when it is disengaged therefrom the uppermost tooth 53ª will leave the pinion 40. At the same instant the lowermost tooth of the rack bar 34 will come into mesh with the pinion 40. The doors 22 will then be free to drop. The center of gravity of the hook or pivoted member 50 being outside the pivot 54, it will remain in a position which insures proper meshing with the pinion 40, and clearance of the pin 56 when the door is closed.

The operating shaft 41 extends from the end of the car to the middle of its length and lies adjacent the outer edges of the dump doors 22 and above them, being journaled in the side stakes 15. There are four of the operating shafts 41 on each car. There is a rack 34, a hooked member 50, a pinion 40, and related parts at each side stake and between all the adjacent doors, and also at the ends of the car. A hand lever 56ª is pivotally mounted upon the outer end of each operating shaft 41 and is adapted to actuate said shaft through a pawl 57 and toothed wheel 58 fixed on said shaft. A detent 59 is provided for engagement with toothed wheel 60 also fixed on the same shaft. The pawl 57 and detent 59 are reversible to permit operation of the shaft in either direction.

In the modification shown in Figs. 16 and 17 the open-bottomed pieces 30ª are made to take the place of the sleeves 30 previously described. This permits a door 22 to be raised from the bar 32ª independently of the other doors resting on the same bar 32ª. In this construction, a continuous bar 32ª is necessary running the length of the series of doors on one side of the car for half its length.

In operating my invention, the lever 56ª is taken by the hand, the pawl 57 being first placed in engagement with the wheel 58. The detent 59 is also placed in contact with the detent wheel. An oscillatory movement is given to the shaft 41 by the lever. The gears 40 are thereby rotated and the racks 34 are raised, the doors 22 being lifted by the racks. When the doors have reached their uppermost position against the angle bars 13, the uppermost tooth 53ª of the pivoted member 50 has come into mesh with the pinion 40. At this moment the last tooth of the rack has left the pinion. A further movement of the pinion causes the member 50 to be rotated inwardly and into engagement with the pin 56. These members 50 then taken the load of holding the doors closed. In opening the doors the pawl 57 and 59 are reversed, and a sufficient oscillatory movement of the lever 56ª is given to withdraw the member 50 from engagement with the pin 56, after which the doors are free to drop and discharge the contents of the car. In dropping, their movement is limited to the proper distance by the engagement of the lugs 36 with the lugs 37.

I claim:

1. In a car of the class described, a dump door operating mechanism comprising an operating shaft, a hollow side stake, collars fixed to said shaft and journaled in the walls of said side stake, and a pinion non-rotatively engaging said collars.

2. In a car of the class described, a dump door operating mechanism comprising an operating shaft, collars fixed to said shaft and journaled in the side stakes of the car, and a pinion carried by said collars.

3. In a car of the class described, a dump door operating mechanism comprising collars fixed to a shaft and journaled in the car frame, and a pinion non-rotatively attached to said collars.

4. In a car of the class described, a dump door operating mechanism comprising an operating shaft, collars fixed to said shaft, and a pinion supported by said collars, said pinion being non-rotatively attached to said collars.

5. In a car of the class described, a dump door operating mechanism comprising an operating shaft, collars fixed to said shaft and having polygonal extension encompassing said shaft, and a pinion having polygonal sockets to fit said extensions on said collars.

6. In a car of the class described, a dump door operating mechanism comprising a rack, a hollow side stake in which said rack slides, a fixed center of oscillation near the base of said stake about which the said rack also oscillates within said stake, and means for guiding said rack which serve the purpose also of limiting the movement of said rack.

7. In a car of the class described, a dump door operating mechanism comprising a rack attached to a dump door, and means for guiding said rack in combined longitudinal and oscillatory motion which means serve the purpose also of limiting the movement of said rack.

8. In a car of the class described, a dump door operating mechanism comprising a rack attached to a dump door, and guided by lugs which serve the purpose also of limiting the movement of said rack in its combined longitudinal and oscillatory motion.

9. In a car of the class described, a dump door operating mechanism comprising a rack attached to a dump door and guided by lugs in a hollow side stake, said lugs serving the purpose also of limiting the movement of said rack in its combined longitudinal and oscillatory motion.

10. In a car of the class described, a dump door operating mechanism comprising a reciprocating and oscillating rack attached to a dump door, said rack at one end having lateral projections bearing upon the inner walls of a hollow side stake, and said rack being guided near its other end by guiding means attached to the side stake.

11. In a car of the class described, drop doors, an operating shaft for said doors, means carried by said doors and operated by said shaft to hold said doors closed, and means joined to said doors and operated by said shaft for closing said doors, the one means becoming engaged with said shaft simultaneously with the disengagement of the other means with said shaft.

12. In a car of the class described, drop doors, an operating shaft for said doors, a toothed member carried by said doors and operated by said shaft to hold said doors closed, and a toothed member pivoted to said doors and operated by said shaft for closing said doors, both said toothed members meshing with a gear on said shaft, the meshing of one beginning simultaneously with the disengagement of the other.

13. In a car of the class described, drop doors, an operating shaft for said doors, means operated by said shaft to hold said doors closed, a gear on said shaft, a hollow side stake provided with stop lugs, a toothed member attached to said doors meshing with said gear and limited in its movement by said lugs.

14. In a car of the class described, drop doors, an operating shaft for said doors, means operated by said shaft to hold said doors closed, a gear on said shaft, a hollow side stake provided with stop lugs, and a rack attached to said doors meshing with said gear and limited in its movement by said lugs.

15. In a car of the class described, drop doors, an operating shaft for said doors, means operated by said shaft for holding said doors closed, a gear on said shaft, a hollow side stake provided with stop lugs, a rack pivoted to said doors, meshing with said gear guided by said stake and provided with means for engaging said stop lugs to limit the downward movement.

16. In a car of the class described, drop doors, an operating shaft for said doors, means operated by said shaft for holding said doors closed, a gear on said shaft, a hollow side stake provided with a guide and stop lugs for said rack, and a rack pivoted to said doors meshing with said gear guided by said side stake and provided with lugs for engaging said stop lugs to limit the downward movement.

17. In a car of the class described, drop doors, an operating shaft for said doors, a rack pivoted to said doors, a gear on said shaft meshing with said rack, and means operated by said shaft for holding said doors closed.

18. In a car of the class described, drop doors, an operating shaft for said doors, a rack pivoted to said doors, a gear on said shaft meshing with said rack, and a pivoted member on said doors operated by said shaft for holding said doors closed.

19. In a car of the class described, drop doors, an operating shaft for said doors, a rack pivoted to said doors, a gear on said shaft meshing with said rack, a pivoted member on said doors operated by said shaft, and means by which said pivoted member is enabled to hold said doors closed.

20. In a car of the class described, drop doors, an operating shaft for said doors, a rack pivoted to said doors, a gear on said shaft meshing with said rack, a pivoted member on said doors operated by said shaft, and means by which said pivoted member is enabled to hold said door closed independently of said rack.

21. In a car of the class described, drop doors, an operating shaft for said doors, a rack pivoted to said doors, a gear on said shaft meshing with said rack, a pivoted member on said doors operated by said shaft when the doors are closed, and means by which said pivoted member is enabled to hold said doors closed independently of said rack.

22. In a car of the class described, drop doors, an operating shaft for said doors, a rack pivoted to said doors, a gear on said shaft meshing with said rack, a pivoted member on said doors provided with teeth to mesh with said gear when the door is closed, and means by which said pivoted member is enabled to hold the door closed independently of said rack.

23. In a car of the class described, a floor having door openings, doors hinged in said openings, an operating shaft for said doors, a gear wheel on said shaft, a rack pivoted to said doors and operated by said gear wheel, a pivoted member on said doors adapted to engage the car frame and hold said doors closed and having teeth adapted to engage said gear wheel simultaneously with the disengagement of the rack teeth from said gear wheel.

24. In a car of the class described, a floor with door openings, doors hinged at one edge in said openings, an operating shaft for said doors, a gear wheel on said shaft a rack pivotally attached to said doors and operated by said gear wheel, a pivoted member on said doors engaging a pin on the car frame for holding said doors closed and having teeth which engage said gear wheel, the teeth of said pivoted member and the teeth of said rack having such relations to the gear wheel that the disengagement of one therewith occurs simultaneously with the engagement of the other therewith.

25. In a car of the class described, a floor with door openings, a hollow side stake, doors hinged at one edge of said openings, an operating shaft for said doors, a gear wheel on said shaft, a rack pivotally attached to said doors and guided in said side stake, a hook pivoted on said doors, gear teeth on said rack and on said hook adapted to alternately engage said gear wheel, a pin engaged by said hook, and a hand lever and ratchet mechanism for operating said shaft.

26. In a car of the class described, a center sill, transverse sills fixed to said center sills, a hollow side stake serving as a guide and housing for a rack, doors hinged at one edge between said transverse sills, an operating shaft journaled in said stake, a gear on said shaft, a rack pivotally attached to said doors and guided in said side stake, a hook pivoted on said doors provided with gear teeth for meshing with the teeth of the gear, the teeth of the rack and on the hook being alternately engageable with the teeth of said gear, and a lever and ratchet mechanism for operating said shaft.

27. In a car of the class described, a center sill, transverse sills fixed to said center sill, a hollow side stake mounted upon the outer extremity of said transverse sills, doors hinged at one edge between said transverse sills, an operating shaft for said doors journaled in said stake, a gear on said shaft within said stake, a rack pivotally attached to said doors guided in said stake and meshing with said gear, a hook pivotally attached to said doors and provided with teeth meshing with said gear, the teeth on said rack and on said hook being alternately engageable with said gear, a pin on the car frame coöperating with said hook to hold said doors in closed position, and a hand lever and ratchet mechanism for operating said stake.

In testimony whereof, I have subscribed my name.

FREDERICK SEABERG.

Witnesses:
HENRY A. PARKS,
ANNA L. WALTON.

---

Copies of this patent may be obtained for five cents each, by addressing the "Commissioner of Patents, Washington, D. C."